US010594183B2

(12) United States Patent
Hashimoto et al.

(10) Patent No.: US 10,594,183 B2
(45) Date of Patent: Mar. 17, 2020

(54) STATOR ASSEMBLING METHOD

(71) Applicant: AISIN AW CO., LTD., Anjo-shi, Aichi-ken (JP)

(72) Inventors: Shingo Hashimoto, Okazaki (JP); Shingo Sato, Okazaki (JP); Kazuya Iwatsuki, Takahama (JP); Kiyotaka Koga, Nishio (JP); Koji Hirabaru, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 238 days.

(21) Appl. No.: 15/500,767

(22) PCT Filed: Aug. 31, 2015

(86) PCT No.: PCT/JP2015/074752
§ 371 (c)(1),
(2) Date: Jan. 31, 2017

(87) PCT Pub. No.: WO2016/035766
PCT Pub. Date: Mar. 10, 2016

(65) Prior Publication Data
US 2017/0222508 A1 Aug. 3, 2017

(30) Foreign Application Priority Data
Sep. 1, 2014 (JP) .................. 2014-177443

(51) Int. Cl.
*H02K 3/28* (2006.01)
*H02K 3/04* (2006.01)
(Continued)

(52) U.S. Cl.
CPC ................ *H02K 3/28* (2013.01); *H02K 3/04* (2013.01); *H02K 3/12* (2013.01); *H02K 15/0435* (2013.01); *H02K 15/06* (2013.01); *H02K 15/066* (2013.01)

(58) Field of Classification Search
CPC .. H02K 15/0435; H02K 15/06; H02K 15/066; H02K 3/04; H02K 3/12; H02K 3/28
See application file for complete search history.

(56) References Cited

U.S. PATENT DOCUMENTS 8,250,734 B2 * 8/2012 Fubuki ................. H02K 15/066
29/596
8,427,024 B2 * 4/2013 Watanabe ................ H02K 3/12
310/179

(Continued)

FOREIGN PATENT DOCUMENTS

EP 1914866 A2 4/2008
JP 2011-193597 A 9/2011
(Continued)

OTHER PUBLICATIONS

Nov. 10, 2015 Search Report issued in International Patent Application No. PCT/JP2015/074752.

(Continued)

*Primary Examiner* — Minh N Trinh
(74) *Attorney, Agent, or Firm* — Oliff PLC

(57) ABSTRACT

A stator assembling method where each of the plurality of the concentrically wound coils has vertexes oriented outward in a axial direction in the planned coil end portions, and a distance in the axial direction between the vertexes of the planned coil end portions on both sides in the axial direction of each of the plurality of concentrically wound coils is gradually reduced toward the conductive wire mounted on the inner diameter side of the stator core from the conductive wire mounted on the outer diameter side of the stator core.

4 Claims, 9 Drawing Sheets

(51) Int. Cl.
   *H02K 15/06*   (2006.01)
   *H02K 3/12*    (2006.01)
   *H02K 15/04*   (2006.01)

(56) References Cited

U.S. PATENT DOCUMENTS

| | | | | |
|---|---|---|---|---|
| 8,587,177 B2* | 11/2013 | Kitamura | ................. | H02K 3/12 |
| | | | | 310/179 |
| 8,857,042 B2* | 10/2014 | Hasegawa | .......... | H02K 15/0428 |
| | | | | 29/596 |
| 10,084,363 B2* | 9/2018 | Hashimoto | ............ | H02K 15/06 |
| 2013/0000105 A1 | 1/2013 | Hasegawa et al. | | |
| 2014/0062230 A1 | 3/2014 | Mori et al. | | |
| 2017/0222508 A1* | 8/2017 | Hashimoto | .............. | H02K 3/04 |

FOREIGN PATENT DOCUMENTS

| | | | |
|---|---|---|---|
| JP | 2012-125043 A | 6/2012 | |
| JP | 2012-222922 A | 11/2012 | |
| JP | 2013-187951 A | 9/2013 | |
| JP | 5566541 B1 | 8/2014 | |

OTHER PUBLICATIONS

Sep. 14, 2017 Search Report issued in European Patent Application No. 15837960.2.

* cited by examiner

STATOR ASSEMBLING METHOD

BACKGROUND

The present disclosure relates to a stator assembling method and a stator.

Conventionally, there is a known stator assembling method for mounting a plurality of coils to a stator core provided with a plurality of slots having openings opened in the inner periphery (see JP-A-2011-193597, for example). The coils described in JP-A-2011-193597 are formed by winding rectangular wires for a plurality of terms. The coils have side portions to be inserted into the slots and coil end portions continuing to the side portions. In the stator assembling method, the above coils are disposed in a space formed at the center of the stator core before being mounted to the stator core and, after being mounted to the stator core, the coils are pushed radially from an inner diameter side to an outer diameter side so that the side portions are inserted into the slots of the stator core. When such pushing is performed, each of the coils is deformed so that the heights in the axial direction of the coil end portions from the end surfaces of the stator core are reduced while the spacing between the side portions on both sides is widened.

SUMMARY

As described above, the coils are formed by winding rectangular wires for a plurality of turns. In such a structure, when the coils are pushed from the inner diameter side to the outer diameter side to be mounted to the stator core, the deformation amount of the rectangular wire on the inner diameter side is different from the deformation amount of the rectangular wire on the outer diameter side. Specifically, the deformation amount of the rectangular wire mounted to the inner diameter side of the stator core is relatively small and the deformation amount of the rectangular wire mounted to the outer diameter side of the stator core is relatively large. Accordingly, if the coil shape before mounting to the stator core is designed without considering the coil shape after mounting to the stator core, even though the heights of the coil end portions of each turn in the coil shape before mounting is designed to a predetermined height to reduce the dimension in the axial direction, the heights of the vertexes of the coil on the inner diameter side after being inserted become higher than the predetermined height.

An exemplary aspect of the present disclosure provides a stator assembling method and a stator that suppress an increase in the heights of the vertexes of the coil on the inner diameter side and reduce the dimension in the axial direction of the coil end portion.

According to an exemplary aspect of the disclosure, there is provided a stator assembling method for mounting a plurality of concentrically wound coils to an annular stator core, each of the concentrically wound coils being formed by winding a conductive wire for a plurality of turns, each of the concentrically wound coils having planned slot accommodation portions and planned coil end portions, and the annular stator core having slots formed between adjacent teeth extending from a back yoke to a radially inner side, a spacing between the slots being widened toward a radially outer side, the stator assembling method including: forming a coil assembly in which the plurality of the concentrically wound coils are disposed annularly and pushing the plurality of the concentrically wound coils included in the coil assembly disposed in a space on an inner diameter side of the stator core to an outer diameter side and inserting the plurality of the concentrically wound coils into the slots of the stator core, in which each of the plurality of the concentrically wound coils has vertexes oriented outward in a axial direction in the planned coil end portions, a distance in the axial direction between the vertexes of the planned coil end portions on both sides in the axial direction of each of the plurality of concentrically wound coils is gradually reduced toward the conductive wire mounted on the inner diameter side of the stator core from the conductive wire mounted on the outer diameter side of the stator core.

According to another aspect of the disclosure, there is provided a stator including: a stator core formed by laminating annular steel plates, the stator core including a plurality of teeth extending to a radially inner side from a back yoke and slots formed between the adjacent teeth; and a plurality of coils, each of the coils being formed by continuously winding a single conductive wire for a plurality of turns, each of the coils including a plurality of slot accommodation portions to be accommodated in the different slots and coil end portions connecting the slot accommodation portions to each other and having vertexes oriented outward in the axial direction, in which each of the coils is formed so that a length of one turn of the conductive wire disposed on an inner diameter side is shorter than a length of one turn of the conductive wire disposed on an outer diameter side and a distance between the vertexes on the inner diameter side and an end surface of the stator core is equal to a distance between the vertexes on the outer diameter side and the end surface of the stator core.

According to the disclosure, it is possible to obtain a stator assembling method and a stator that suppress an increase in the heights of the vertexes of the coil on the inner diameter side and reduce the dimension in the axial direction of the coil end portion.

BRIEF DESCRIPTION OF THE DRAWINGS

Embodiments will be described in detail below with reference to the drawings.

DETAILED DESCRIPTION OF EMBODIMENTS

Figure 1:
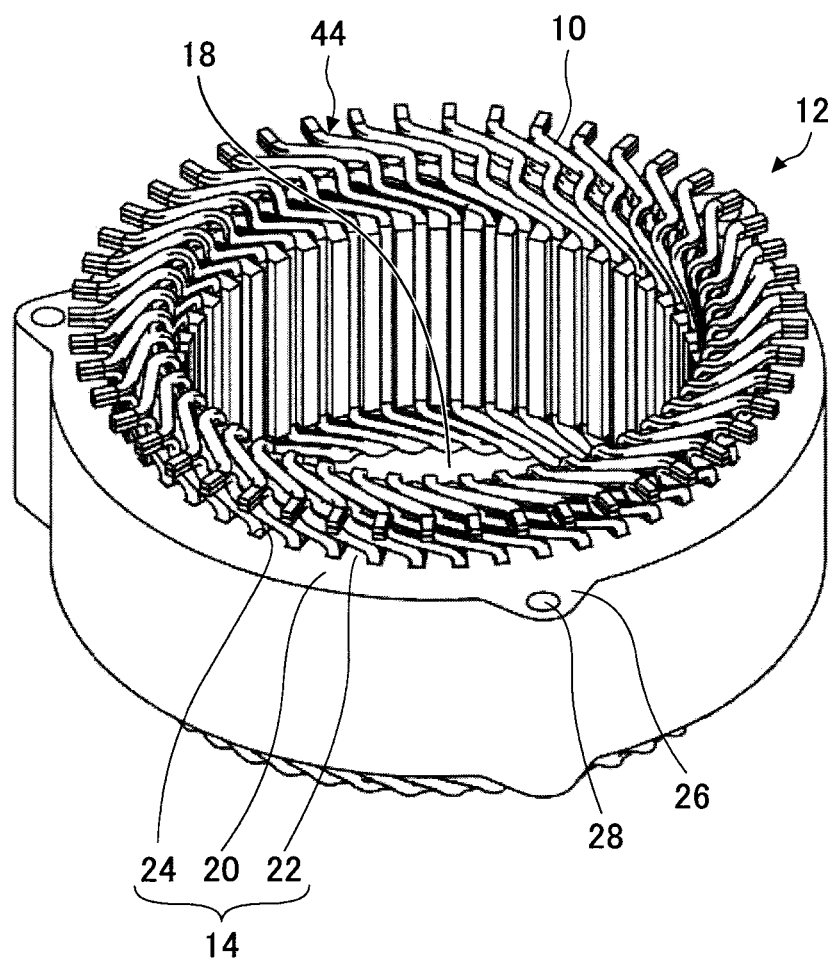
FIG. 1 is a structural diagram illustrating rectangular wire concentrically wound coils to which the stator assembling method according to an embodiment of the disclosure is applied.
Figure 2:
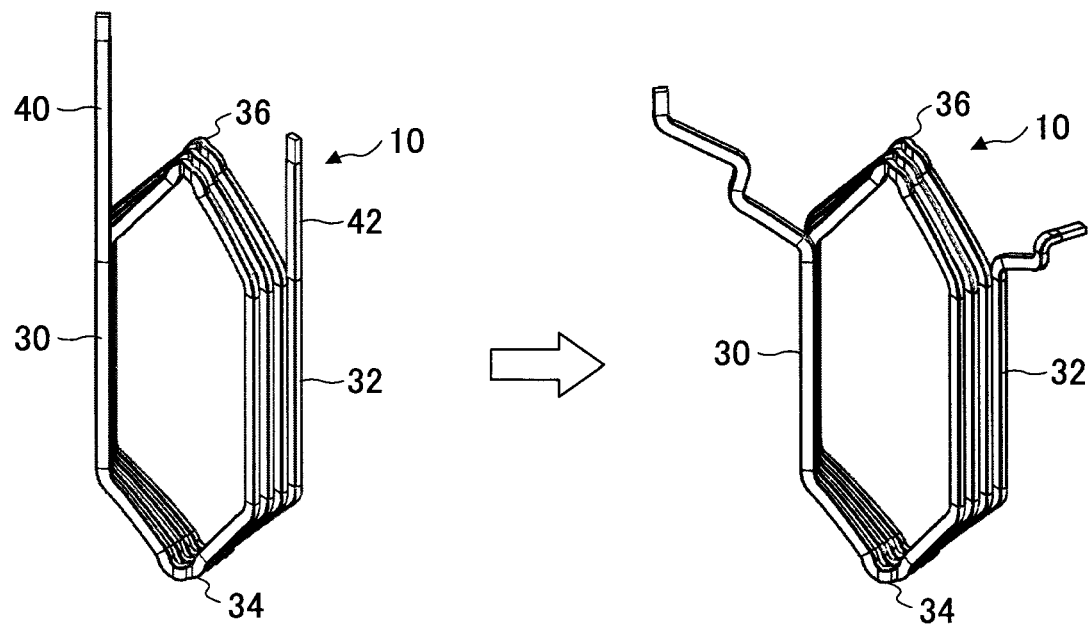
FIG. 2 is a perspective view illustrating the rectangular wire concentrically wound coil according to the embodiment before and after lead wire portions are bent.
Figure 3A:
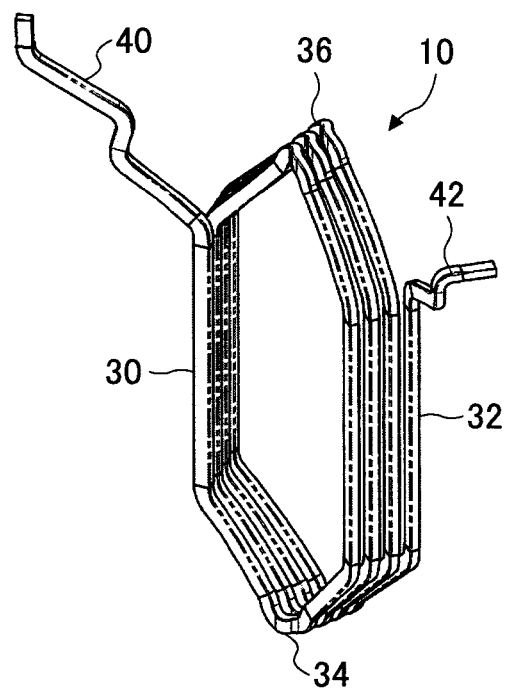
FIG. 3A illustrates the state of the rectangular wire concentrically wound coil according to the embodiment before the rectangular wire concentrically wound coil is mounted to the stator core.
Figure 3B:
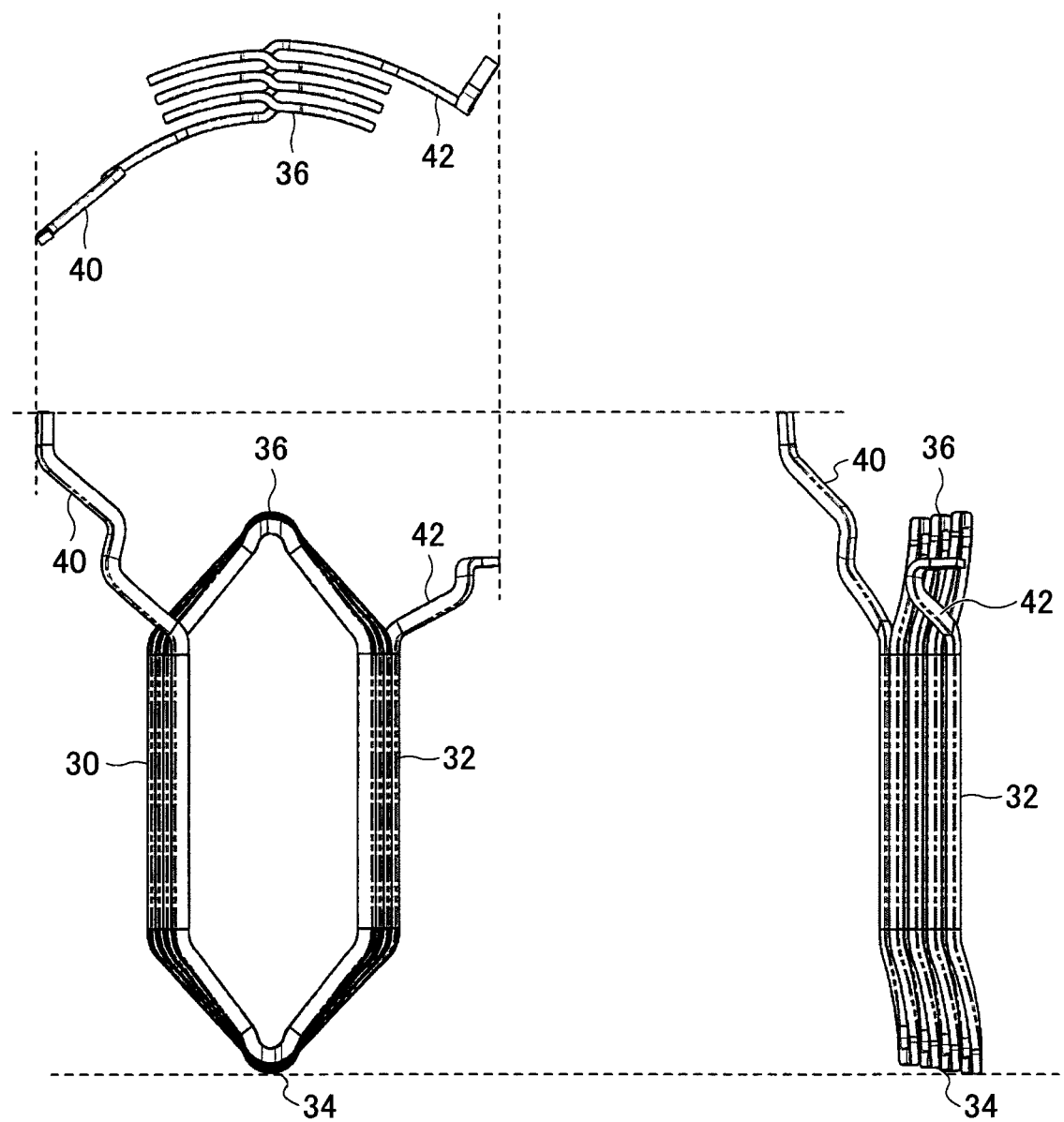
FIG. 3B is a three-plane view illustrating the state of the rectangular wire concentrically wound coil according to the embodiment before the rectangular wire concentrically wound coil is mounted to the stator core.
Figure 4A:
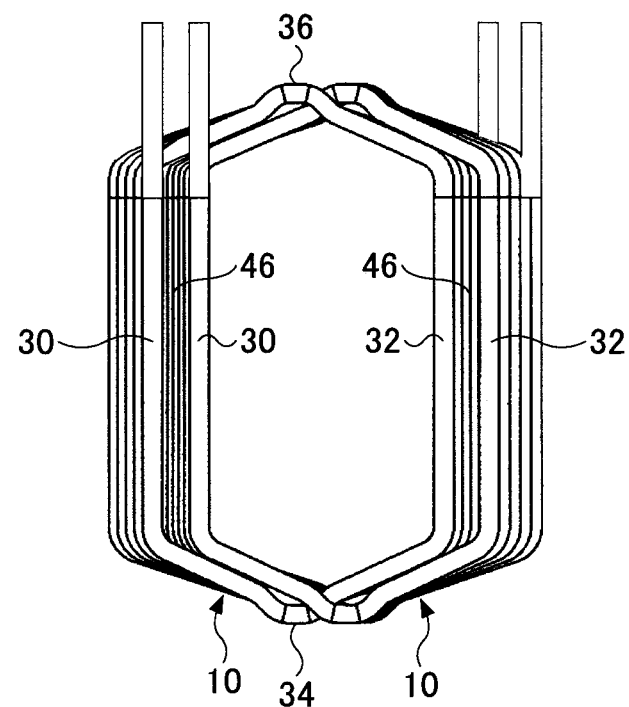
FIG. 4A illustrates the positional relationship between two rectangular wire concentrically wound coils adjacent to each other in the circumferential direction in the embodiment.
Figure 4B:
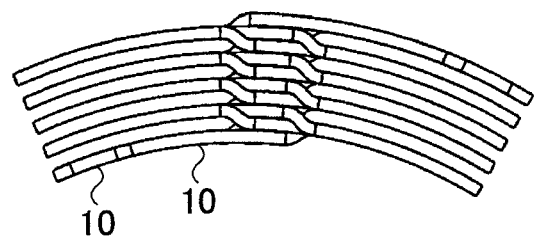
FIG. 4B illustrates the positional relationship between two rectangular wire concentrically wound coils adjacent to each other in the circumferential direction in the embodiment.
Figure 5:
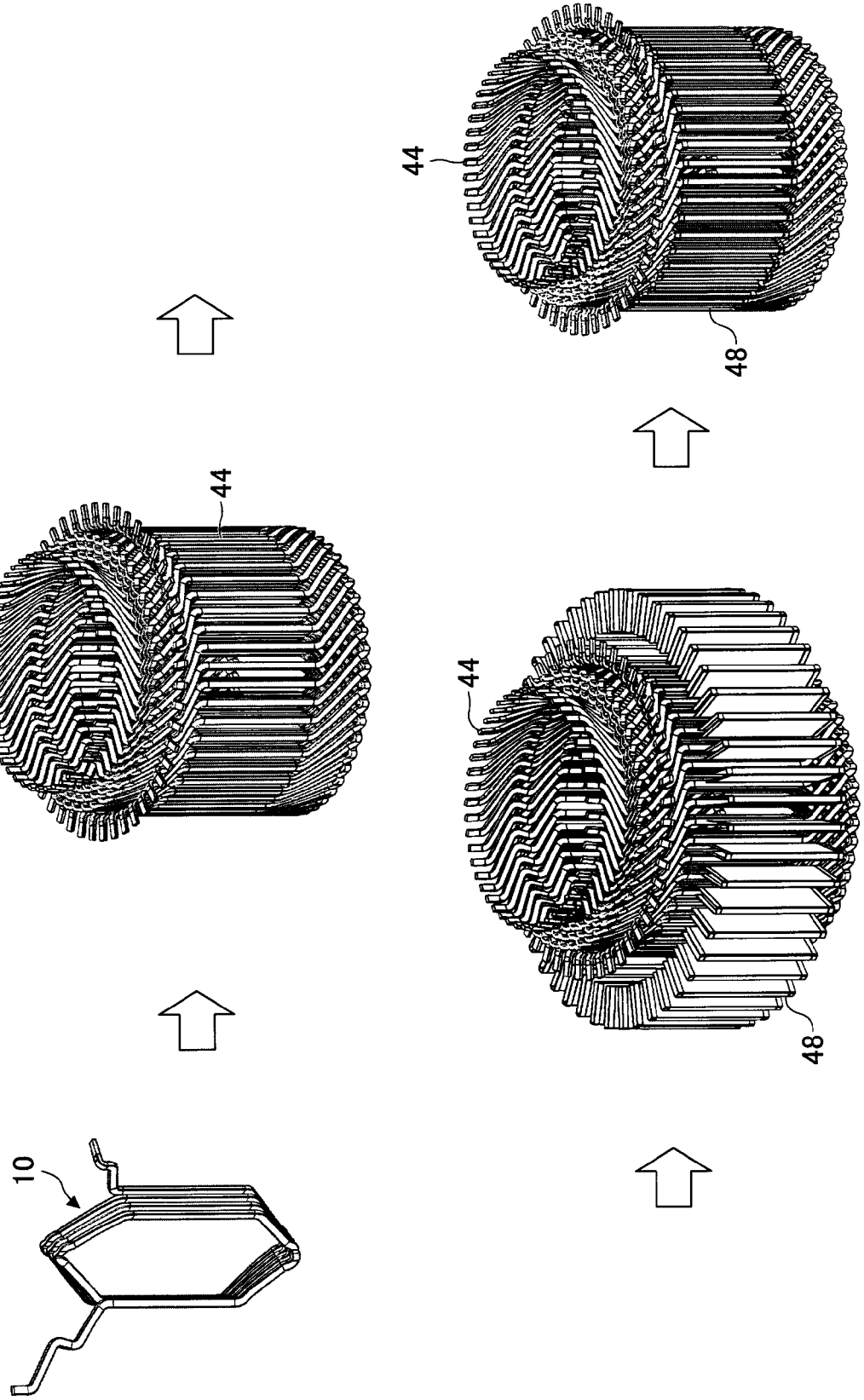
FIG. 5 illustrates an example of the procedure for forming a coil assembly shaped like an annular cage using a plurality of rectangular wire concentrically wound coils in the embodiment.

FIG. 1 is the structural diagram illustrating rectangular wire concentrically wound coils 10 to which the stator assembling method according to the embodiment of the disclosure is applied. FIG. 2 is the perspective view illustrating the rectangular wire concentrically wound coil 10 according to the embodiment before and after the lead wire portions are bent. FIGS. 3A and 3B illustrate the state of the rectangular wire concentrically wound coil 10 according to the embodiment before the rectangular wire concentrically wound coil 10 is mounted to the stator core. FIG. 3A is the perspective view and FIG. 3B is the three-plane view including a front view when the radially outer side is seen from the stator shaft center side, a view as seen from the axial direction of the stator, and a view as seen from the circumferential direction of the stator. FIGS. 4A and 4B illustrate the positional relationship between the two rectangular wire concentrically wound coils 10 adjacent to each other in the circumferential direction in the embodiment. FIG. 4A is a front view when the radially outer side is seen from the stator shaft center side and FIG. 4B is a view as seen from the axial direction of the stator. In addition, FIG. 5 illustrates an example of the procedure for forming a coil assembly shaped like an annular cage using the plurality of rectangular wire concentrically wound coils 10 in the embodiment.

The rectangular wire concentrically wound coils 10 according to the embodiment are stator coils used for a stator 12. The stator 12 is a stator used for a rotary electric machine such as, for example, a three-phase AC motor. The stator 12 is a member, disposed on the radially outer side of the rotor with a predetermined air gap, that generates a magnetic field for rotating the rotor by energization. The stator 12 includes the rectangular wire concentrically wound coils 10 and a stator core 14.

The stator core 14 is a member formed in a hollow cylinder. A space (inner diameter side space) 18 for accommodating the rotor is formed on the inner diameter side of the stator core 14. The stator core 14 may be formed by laminating a plurality of insulation-coated electromagnetic steel plates in the axial direction. In addition, the end surface on the radially outer side of the stator core 14 may be provided with a cylindrical yoke made of a material obtained by compression-molding insulation-coated soft magnetic powder.

The stator core 14 includes a back yoke 20 formed in an annular ring and teeth 22 extending from the end surface on the radially inner side of the back yoke 20 toward (toward the shaft center) the radially inner side. The plurality of (for example, 48) teeth 22 are provided in the back yoke 20 at regular intervals in the circumferential direction. One slot 24 for holding a rectangular wire concentrically wound coil 10 is formed between the two teeth 22 adjacent to each other in the circumferential direction. The slots 24 are opened toward the shaft center and extend to the radially outer side. The width in the circumferential direction of the slot 24 is substantially constant regardless of the position in the radial direction or is smaller toward the radially outer side. The stator core 14 is configured so that the plurality of slots 24 extend radially from the shaft center.

The stator core 14 is provided with ear portions 26 used to fix the stator 12 to the motor case. The ear portion 26 is formed in a mount projecting from the radially outward end surface (outer circumferential surface) of the body (specifically, the back yoke 20) of the stator core 14 to the radially outer side. The plurality of (for example, 3) ear portions 26 are provided distantly from each other in the circumferential direction. The ear portion 26 is provided with a through hole 28 penetrating through the ear portions 26 in the axial direction. The stator 12 is fixed to the motor case by tightening the bolts penetrating through the through holes 28 of the ear portions 26 using nuts through the motor case.

In addition, the rectangular wire concentrically wound coil 10 is formed by a rectangular wire having a quadrilateral (specifically, rectangular) cross section. This rectangular wire is made of metal having a high conductivity, such as, for example, copper or aluminum. The corners of the rectangular cross section of the rectangular wire may be rounded. The plurality of (for example, 48) rectangular wire concentrically wound coils 10 are provided for the stator core 14 in the circumferential direction.

Each of the rectangular wire concentrically wound coils 10 is a cassette coil formed by winding a rectangular wire for a predetermined number of (for example, five) turns and bending the wound rectangular wire. The rectangular wire concentrically wound coil 10 is formed by winding one straight rectangular wire for a predetermined number of turns while shaping the wire in an ellipse using a winding formation apparatus and then bending the wound wire in a substantially hexagon or substantially an octagon using a shaping apparatus.

The rectangular wire concentrically wound coil 10 has slot accommodation portions 30 and 32 and coil end portions 34 and 36. The slot accommodation portions 30 and 32 are inserted (accommodated) into the slots 24 of the stator core 14 and extend substantially straight by penetrating through the slots 24 in the axial direction. In the single rectangular wire concentrically wound coil 10, the slot accommodation portion 30 and the slot accommodation portion 32 are accommodated in the different slots 24 apart from each other by a predetermined distance in the circumferential direction of the stator core 14. The coil end portions 34 and 36 are curved portions connected to the slot accommodation portions 30 and 32 and projecting outward in the axial direction from the end surface in the axial direction of the stator core 14 and connecting the two slot accommodation portions 30 and 32 apart from each other in the circumferential direction.

The rectangular wire concentrically wound coil 10 is configured so that a plurality of rectangular wires are laminated in the short-side direction of the cross section of the rectangular wire and a predetermined space is formed in the lamination direction in which the rectangular wires are laminated between adjacent rectangular wires. The rectangular wire concentrically wound coil 10 is formed to have a trapezoid cross section so that the separation distance (that is, the separation distance along the circumferential direction or the separation distance as seen from the shaft center) in the circumferential direction between the two slot accommodation portions 30 and 32 changes depending on the position in the lamination direction. The trapezoid cross section is formed so that the slot accommodation portions 30 and 32 of the rectangular wire concentrically wound coil 10 are appropriately accommodated in the slots 24. The rectangular wire concentrically wound coils 10 are assembled to the stator core 14 so that the lamination direction of the rectangular wires matches the radial direction orthogonal to the axial direction of the stator core 14.

The rectangular wire coil end portions 34 and 36 of the rectangular wire concentrically wound coil 10 are formed in a plurality of different non-linear shapes. Specifically, the coil end portions 34 and 36 are formed in, for example, three non-linear shapes: crank formation like a crank bent in steps toward the radial direction of the stator core 14, arc formation like an arc curved along the arc of the annular stator core 14, and edgewise formation like a knee bent in the longitudinal direction of the cross section of a rectangular wire. Crank formation is bending performed for a lane change between the conductive wires in the lamination direction of the rectangular wires. Arc formation is bending performed to efficiently accommodate the rectangular wire concentrically wound coils 10 in the slots 24. In addition, edgewise formation is bending performed to efficiently dispose the plurality of the rectangular wire concentrically wound coils 10.

The rectangular wire concentrically wound coil 10 has lead wire portions 40 and 42 formed at both ends of the rectangular wire. The lead wire portion 40 is connected to the end of the slot accommodation portion 30 to be accommodated in the slot 24. The lead wire portion 42 is connected to the end of the slot accommodation portion 32 to be accommodated in the slot 24. The lead wire portions 40 and 42 project in the axial direction from the end surface in the axial direction of the stator core 14 when the slot accommodation portions 30 and 32 are accommodated in the slots 24 of the stator core 14. It is assumed that the lead wire portions 40 and 42 project in the axial direction on a coil end portion 36 side.

The lead wire portion 40 is an end portion positioned on the inner diameter side in the rectangular wire concentrically wound coil 10 formed by winding a rectangular wire for a predetermined number of turns. The lead wire portion 42 is an end portion positioned on the outer diameter side in the rectangular wire concentrically wound coil 10. The lead wire portion 40 is referred to below as the inner diameter side lead wire portion 40 and the lead wire portion 42 is referred to below as the outer diameter side lead wire portion 42 as appropriate. Immediately after the rectangular wire concentrically wound coil 10 is bent in substantially a hexagon or substantially an octagon by the shaping apparatus, the lead wire portions 40 and 42 are formed so as to extend substantially linearly. If the rectangular wire concentrically wound coil 10 is attached to the stator core 14 and the slot accommodation portions 30 and 32 are accommodated in the slots 24 of the stator core 14, the lead wire portions 40 and 42 are formed so as to extend substantially linearly in the axial direction.

After the concentrically wound coil 10 is bent in substantially a hexagon or substantially an octagon by the shaping apparatus, the lead wire portions 40 and 42 are crooked and bent as illustrated in FIGS. 2, 3A, and 3B before a coil assembly 44 is configured by the plurality of the rectangular wire concentrically wound coils 10. After the coil assembly 44 is configured and then the rectangular wire concentrically wound coils 10 are inserted into the slots 24 of the stator core 14, the lead wire portions 40 and 42 are also crooked and bent in a final desired shape.

For example, before the coil assembly 44 is configured, as illustrated in FIGS. 2, 3A, and 3B, the inner diameter side lead wire portion 40 is first bent in a circumferentially outward direction which is an edgewise direction of the rectangular wire at a connection part connecting to the slot accommodation portion 30, next bent in an circumferentially inward direction which is the edgewise direction of the rectangular wire at a part positioned closer the end than the bent portion, then bent in the circumferentially outward direction which is the edgewise direction of the rectangular wire at a part positioned closer to the end than the bent portion, and finally bent in the circumferentially inward direction which is the edgewise direction of the rectangular wire at a portion closer the end than the bent portion. The positions and the degrees of bending of the bent portions of the inner diameter side lead wire portion 40 are set according to the final desired shape of the rectangular wire concentrically wound coil 10.

In addition, the outer diameter side lead wire portion 42 is first bent in the circumferentially outward direction which is the edgewise direction of the rectangular wire in a vicinity of the connection part connecting to the slot accommodation portion 32, next bent in the circumferentially inward direction which is the edgewise direction of the rectangular wire at a part positioned closer to the end than the bent portion, and finally bent toward the radially outer side which is the flatwise direction of the rectangular wire at a portion positioned closer to the end than the bent portion. The positions and the degrees of bending of the bent portions of the outer diameter side lead wire portion 42 are set according to the final desired shape of the rectangular wire concentrically wound coil 10.

The plurality of rectangular wire concentrically wound coils 10 are disposed in the circumferential direction to configure the coil assembly 44 shaped like an annular cage. The coil assembly 44 is formed in an annular cage by crooking and bending the rectangular wire concentrically wound coils 10 as described above in the lead wire portions 40 and 42 and disposing the plurality of the rectangular wire concentrically wound coils 10 annularly in the circumferential direction. The coil assembly 44 is formed so as to achieve the following items (i) to (iii).

(i) Each of the plurality of rectangular wire concentrically wound coils 10 is accommodated in the slots 24 of the stator core 14 in a state in which the rectangular wire concentrically wound coils 10 are displaced one by one in the circumferential direction (see FIG. 4A). (ii) The two rectangular wire concentrically wound coils 10 disposed adjacently to each other in the circumferential direction are assembled so that the rectangular wires of individual stages are superposed alternately in the lamination direction (that is, the radial direction) (see FIG. 4B). (iii) The two rectangular wire concentrically wound coils 10 disposed apart from each other in the circumferential direction by a predetermined distance are assembled so that the rectangular wires of the individual stages of the slot accommodation portion 30 of one coil 10 and the rectangular wires of the individual stages of the slot accommodation portion 32 of the other coil 10 are arranged alternately in the lamination direction (that is, the radial direction) in the same slot 24. Upon completion of the assembly illustrated in (ii) above, tooth holes 46 in which the teeth 22 of the stator core 14 are inserted and disposed are formed between the slot accommodation portions 30 and 32 of the two rectangular wire concentrically wound coils 10 adjacent to each other in the circumferential direction of the coil assembly 44.

When the stator 12 is applied to, for example, a three-phase AC motor, the rectangular wire concentrically wound coils 10 constitute a U-phase coil, V-phase coil, or W-phase coil. For example, in the coil assembly 44, one polarity is formed by the six rectangular wire concentrically wound coils 10 arranged in the circumferential direction including two U-phase coils, two V-phase coils, and two W-phase coils, which are the rectangular wire concentrically wound coils 10, arranged in the circumferential direction.

The stator 12 also has an insulation member 48 for ensuring electric insulation between the stator core 14 and the rectangular wire concentrically wound coils 10. The insulation member 48 is a slot cell that has the shape corresponding to the slot 24 of the stator core 14, is attached to each of the slots 24, and has a U-shaped cross section. The insulation member 48 is a thin film member made of paper or resin (such as, for example, thermoset resin or thermoplastic resin). After the coil assembly 44 shaped like an annular cage including a predetermined number of the rectangular wire concentrically wound coils 10 is formed as illustrated in FIG. 5, the insulation member 48 is attached to the coil assembly 44 by inserting the insulation member 48 into the slot accommodation portions 30 and 32 of the rectangular wire concentrically wound coils 10 from the outer diameter side to the inner diameter side of the slot accommodation portions 30 and 32.

Next, the procedure (stator assembling method) for manufacturing the stator 12 in the embodiment will be described.

In the embodiment, the stator 12 is assembled by attaching the rectangular wire concentrically wound coils 10 of the coil assembly 44 to the stator core 14, that is, by inserting the slot accommodation portions 30 and 32 of the rectangular wire concentrically wound coils 10 into the slots 24 of the stator core 14.

In the coil assembly 44, before the slot accommodation portions 30 and 32 of the rectangular wire concentrically wound coil 10 are inserted into the slots 24 of the stator core 14, the separation distance between the two slot accommodation portions 30 and 32 of the rectangular wire concentrically wound coil 10 is smaller than after the slot accommodation portions 30 and 32 are inserted into the slots 24, so the length in the axial direction (specifically, the distance in the axial direction between the end (vertex 34a) in the axial direction of the coil end portion 34 and the end (vertex 36a) in the axial direction of the coil end portion 36) is larger and the entire outer diameter is smaller (specifically, the entire outer diameter is slightly smaller than the inner diameter of the teeth 22 of the stator core 14).

For convenience sake, the coil assembly 44 before the slot accommodation portions 30 and 32 are inserted into the slots 24 of the stator core 14 is referred to as the initial coil assembly 44 and the coil assembly 44 after the slot accommodation portions 30 and 32 are inserted into the slots 24 of the stator core 14 is referred to as the inserted coil assembly 44. In addition, the rectangular wire concentrically wound coil 10 before the slot accommodation portions 30 and 32 are inserted into the slots 24 of the stator core 14 is referred to as the uninserted coil 10 and the rectangular wire concentrically wound coil 10 after the slot accommodation portions 30 and 32 are inserted into the slots 24 of the stator core 14 is referred to as the inserted coil 10.

In the embodiment, the initial coil assembly 44 shaped like an annular cage and the cylindrical stator core 14 are prepared. In the initial coil assembly 44, the plurality of uninserted coils 10 are disposed annularly and the insulation member 48 is attached to the slot accommodation portions 30 and 32 of the rectangular wire concentrically wound coils 10. As described above, the initial coil assembly 44 is configured to have an outer diameter slightly smaller than the inner diameter of the teeth 22 of the stator core 14. First, the stator core 14 is assembled to the initial coil assembly 44 so that the initial coil assembly 44 is inserted into the inner diameter side space 18 from the axial direction of the coil end portion 34 side on which the lead wire portions 40 and 42 of the uninserted coils 10 are not provided. When this assembly is performed, the initial coil assembly 44 is disposed in the inner diameter side space 18 of the stator core 14.

After the initial coil assembly 44 and the stator core 14 are inserted and disposed as described above, the initial coil assembly 44 and the stator core 14 are positioned each other in the circumferential direction, the jig is pushed against the coil end portions 34 and 36 of the uninserted coils 10 included the initial coil assembly 44 to push the coil end portions 34 and 36 to the radially outer side. When the coil end portions 34 and 36 of the uninserted coils 10 are pushed to the radially outer side, the slot accommodation portions 30 and 32 connected to the coil end portions 34 and 36 follow the pushed coil end portions 34 and 36 and are pulled toward the radially outer side, so the slot accommodation portions 30 and 32 are inserted into the slots 24.

The insertion of the slot accommodation portions 30 and 32 into the slots 24 is performed for all the rectangular wire concentrically wound coils 10 included in the initial coil assembly 44 formed in an annular cage. When all the rectangular wire concentrically wound coils 10 are pushed radially to the radially outer side, the rectangular wire concentrically wound coils 10 are assembled and mounted to the stator core 14.

In the process of inserting the slot accommodation portions 30 and 32 into the slots 24, the rectangular wire concentrically wound coils 10 are bent so that the separation distance between the slot accommodation portion 30 and the slot accommodation portion 32 is gradually increased and the distance in the axial direction between the vertex 34a of the coil end portion 34 and the vertex 36a of the coil end portion 36 is gradually reduced over time. At this time, the part close to the coil end portion 34 and the part close to the coil end portion 36 of the rectangular wire concentrically wound coil 10 are bent substantially in the same way.

In this stator assembling method, the two rectangular wire concentrically wound coils 10 disposed in different positions in the circumferential direction are assembled to each other so that the rectangular wires of the slot accommodation portions 30 and 32 are alternately arranged in a radial direction in the same slots 24 and, after the initial coil assembly 44 including a predetermined number of the rectangular wire concentrically wound coils 10 disposed annularly is formed, in the state in which the initial coil assembly 44 is disposed in the inner diameter side space 18 (formed in a hollow cylinder) of the stator core 14, the slot accommodation portions 30 and 32 of the plurality of the rectangular wire concentrically wound coils 10 constituting the coil assembly 44 can be inserted into the slots 24 of the stator core 14 and the rectangular wire concentrically wound coils 10 constituting the coil assembly 44 can be assembled to the stator core 14.

Figure 6A:
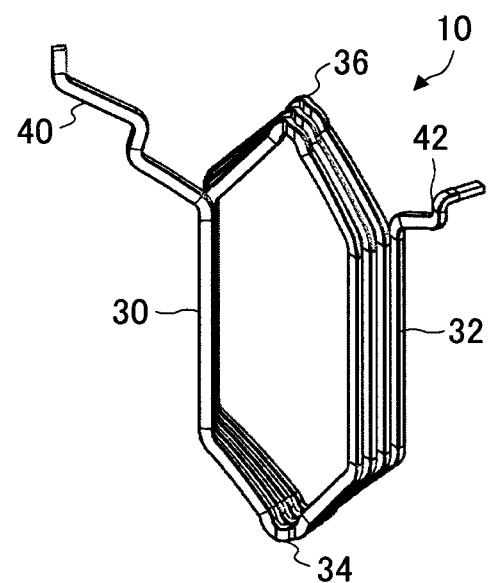
FIG. 6A illustrates the state of the rectangular wire concentrically wound coil according to the embodiment before the rectangular wire concentrically wound coil is mounted to the stator core.
Figure 6B:
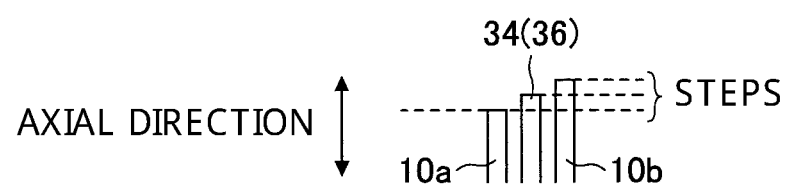
FIG. 6B illustrates the state of the rectangular wire concentrically wound coil according to the embodiment before the rectangular wire concentrically wound coil is mounted to the stator core.
Figure 7A:
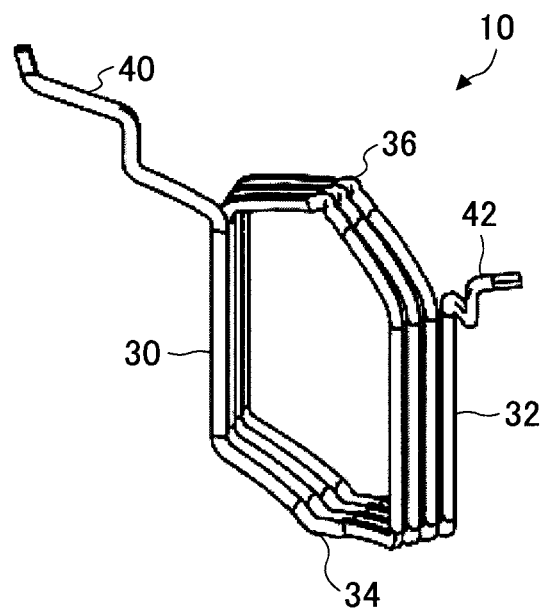
FIG. 7A illustrates the state of the rectangular wire concentrically wound coil according to the embodiment after the rectangular wire concentrically wound coil is mounted to the stator core.
Figure 7B:
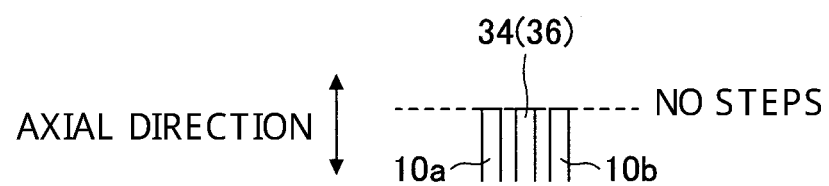
FIG. 7B illustrates the state of the rectangular wire concentrically wound coil according to the embodiment after the rectangular wire concentrically wound coil is mounted to the stator core.
Figure 8A:
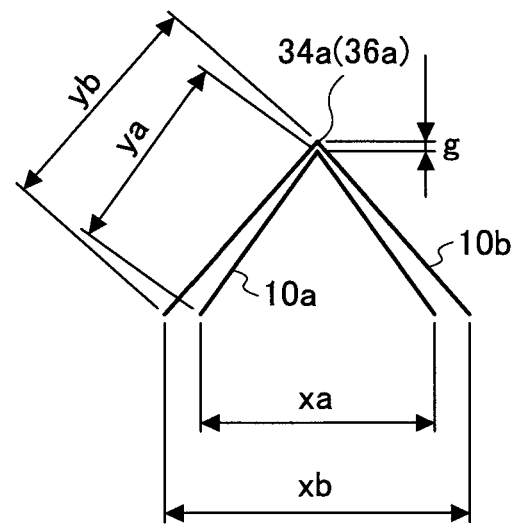
FIG. 8A is a schematic view illustrating the state of the coil end portion of the rectangular wire concentrically wound coil according to the embodiment before the rectangular wire concentrically wound coil is mounted to the stator core.
Figure 8B:
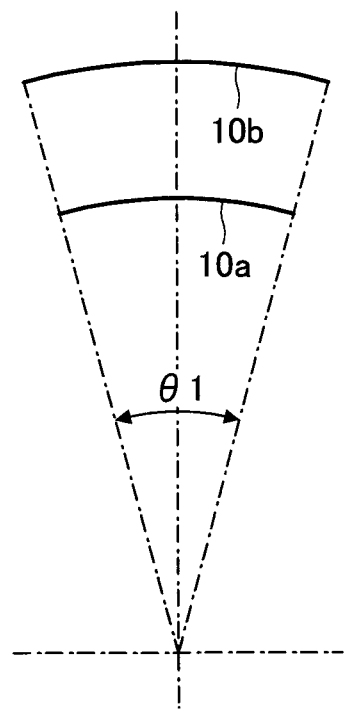
FIG. 8B is a schematic view illustrating the state of the coil end portion of the rectangular wire concentrically wound coil according to the embodiment before the rectangular wire concentrically wound coil is mounted to the stator core.
Figure 9A:
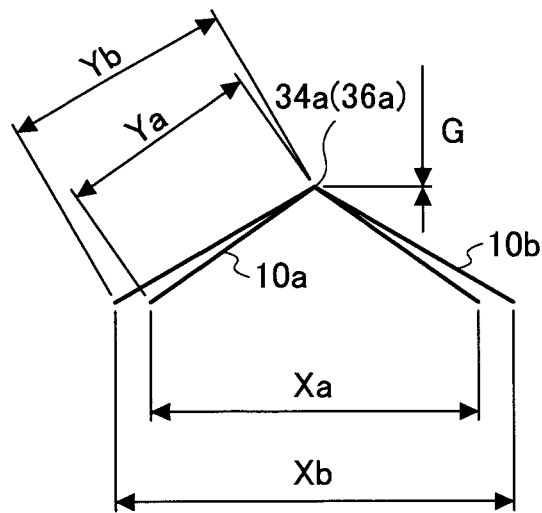
FIG. 9A is a schematic view illustrating the state of the coil end portion of the rectangular wire concentrically wound coil according to the embodiment after the rectangular wire concentrically wound coil is mounted to the stator core.
Figure 9B:
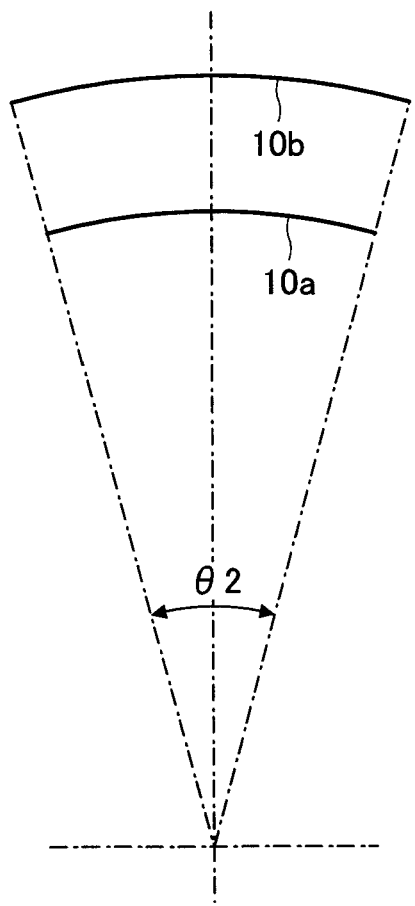
FIG. 9B is a schematic view illustrating the state of the coil end portion of the rectangular wire concentrically wound coil according to the embodiment after the rectangular wire concentrically wound coil is mounted to the stator core.

FIGS. 6A and 6B illustrate the state of the rectangular wire concentrically wound coil 10 according to the embodiment before the rectangular wire concentrically wound coil 10 is mounted to the stator core 14. FIGS. 7A and 7B illustrate the state of the rectangular wire concentrically wound coil 10 according to the embodiment after the rectangular wire concentrically wound coil 10 is mounted to the stator core 14. FIGS. 6A and 7A are perspective views illustrating the rectangular wire concentrically wound coil 10 and FIGS. 6B and 7B are enlarged cross sectional views illustrating the coil end portions 34 and 36. FIGS. 8A and 8B schematic views illustrating the state of the coil end portions 34 and 36 of the rectangular wire concentrically wound coil 10 according to the embodiment before the rectangular wire concentrically wound coil 10 is mounted to the stator core 14. In addition, FIGS. 9A and 9B are schematic views illustrating the state of the coil end portions 34 and 36 of the rectangular wire concentrically wound coil 10 according to the embodiment after the rectangular wire concentrically wound coil 10 is mounted to the stator core 14. FIGS. 8A and 9A are views when the coil end portions 34 and 36 are seen from the radially inner side to the radially outer side and FIGS. 8B and 9B are views when the coil end portions 34 and 36 are seen from the axial direction.

In the following, the slot accommodation portions 30 and 32 of the uninserted coil 10 are referred to as the planned slot accommodation portions 30 and 32 and the coil end portions 34 and 36 of the uninserted coil 10 are referred to as the planned coil end portions 34 and 36, respectively. In addition, the rectangular wire mounted to the innermost diameter side of the stator core 14 is referred to as a rectangular wire 10a and the rectangular wire mounted to the outermost diameter side of the stator core 14 is referred to as a rectangular wire 10b.

In the embodiment, as illustrated in FIGS. 6A and 6B, the uninserted coil 10 is formed to have steps in the part from the rectangular wire 10a to the rectangular wire 10b in the planned coil end portions 34 and 36. Specifically, in the uninserted coil 10, the distance (height) in the axial direction from the connection positions between the planned coil end portion 34 and the planned slot accommodation portions 30 and 32 to the position of the vertex 34a is gradually increased toward the rectangular wire 10b on the outer diameter side from the rectangular wire 10a on the inner diameter side and the distance (height) in the axial direction from the connection positions between the planned coil end portion 36 and the planned slot accommodation portions 30 and 32 to the position of the vertex 36a is gradually increased toward the rectangular wire 10b on the outer diameter side from the rectangular wire 10a on the inner diameter side. That is, in the uninserted coil 10, the distance in the axial direction between the vertex 34a of the planned coil end portion 34 and the vertex 36a of the planned coil end portion 36 is gradually increased toward the rectangular wire 10b from the rectangular wire 10a.

When the uninserted coil 10 is compared with the inserted coil 10, the separation distance between the two planned slot accommodation portions 30 and 32 is smaller and the distance in the axial direction between the vertex 34a, which is the end in the axial direction of the planned coil end portion 34, and the vertex 36a, which is the end in the axial direction of the planned coil end portion 36, is larger. The outer diameter of the entire initial coil assembly 44 configured by the uninserted coils 10 is slightly smaller than the inner diameter of the teeth 22 of the stator core 14.

In addition, in the process of inserting the slot accommodation portions 30 and 32 into the slots 24, the rectangular wire concentrically wound coils 10 are bent and deformed so that the separation distance between the planned slot accommodation portion 30 and the planned slot accommodation portion 32 is gradually increased and the distance in the axial direction between the vertex 34a of the planned coil end portion 34 and the vertex 36a of the coil end portion 36 is gradually reduced over time (inserted coil 10).

In the above uninserted coil 10, the difference (that is, the difference in the distance in the axial direction between the vertex 34a of the planned coil end portion 34 and the vertex 36a of the planned coil end portion 36) in the distance in the axial direction from the connection positions between the planned coil end portions 34 and 36 and the planned slot accommodation portions 30 and 32 to the vertex 34a and the vertex 36a in the part from the rectangular wire 10a on the innermost diameter side to the rectangular wire 10b on the outermost diameter side is set so that the above distance in the axial direction is identical for all rectangular wires after the planned slot accommodation portions 30 and 32 are inserted into the slots 24. Specifically, the rectangular wire concentrically wound coil 10 is designed so that the coil circumferential length of the circumferential conductive wire on the outer diameter side is longer than that of the circumferential conductive wire on the inner diameter side. In this example, as a preferable embodiment, the coil circumferential length of the rectangular wire concentrically wound coil 10 is designed so the length of one turn of the conductive wire gradually is increased toward the outer diameter side from the inner diameter side. The coil circumferential length indicates the length of one turn of a conductive wire and specifically corresponds to the sum of the lengths of the slot accommodation portions 30 and 32 and the lengths of the coil end portions 34 and 36. In the calculation of the coil circumferential length, the start point (and the end point) of one turn may be arbitrarily determined.

Accordingly, after the rectangular wire concentrically wound coil 10 is mounted to the stator core 14, no steps are present in the part from the rectangular wire 10a to the rectangular wire 10b in the planned coil end portions 34 and 36 as illustrated in FIGS. 7A and 7B. As a result, the distance between the vertexes on the inner diameter side of the coil end portions 34 and 36 and the end surface of the stator core 14 equals the distance between the vertexes on the outer diameter side of the coil end portions 34 and 36 and the stator core 14.

Even after the rectangular wire concentrically wound coil 10 is mounted to the stator core 14, the coil circumferential length of one turn of the conductive wire of the concentrically wound coil 10 is gradually increased toward the outer diameter side from the inner diameter side. Specifically, as for the length (sum of the lengths of slot accommodation portions 30 and 32 and the lengths of the coil end portions 34 and 36) of one turn of the conductive wire of the coil, the lengths of the slot accommodation portions 30 and 32 are the same between the coil on the inner diameter side and the coil on the outer diameter side, but the lengths of the coil end portions 34 and 36 are different between the coil on the inner diameter side and the coil on the outer diameter side. (Details will be described later with reference to FIGS. 9A and 9B.)

When the rectangular wire concentrically wound coil 10 having the above structure changes from the uninserted coil 10 to the inserted coil 10 (that is, the planned slot accommodation portions 30 and 32 of the rectangular wire concentrically wound coil 10 are inserted into the slots 24), the rectangular wire concentrically wound coil 10 is deformed over time so that the separation distance between the planned slot accommodation portion 30 and the planned slot accommodation portion 32 is gradually increased and the distance in the axial direction between the vertex 34a of the planned coil end portion 34 and the vertex 36a of the planned coil end portion 36 is gradually reduced.

At this time, the deformation of the rectangular wire concentrically wound coil 10 is performed so that the deformation amount of the rectangular wire 10a on the innermost diameter side is different from the deformation amount of the rectangular wire 10b on the outermost diameter side and the deformation amount of the rectangular wire 10a on the innermost diameter side is relatively small and the deformation amount of the rectangular wire 10b on the outermost diameter side is relatively large. That is, in the deformation of the rectangular wire concentrically wound coil 10, for each of the rectangular wires between the rectangular wire 10a on the innermost diameter side and the rectangular wire 10b on the outermost diameter side, the amount of increase in the separation distance between the planned slot accommodation portion 30 and the planned slot accommodation portion 32 differs and the amount of reduction in the distance in the axial direction between the vertex 34a of the planned coil end portion 34 and the vertex 36a of the planned coil end portion 36 differs. Specifically, sequentially from the rectangular wire 10a on the innermost diameter side to the rectangular wire 10b on the outermost diameter side, the amount of increase in the separation distance between the planned slot accommodation portions 30 and 32 becomes large and the amount of reduction in the distance in the axial direction between the vertexes 34a and 36a of the planned coil end portions 34 and 36 becomes large.

For example, as illustrated in FIGS. 8A and 8B, in the uninserted coil 10, it is assumed that the separation distance between the planned slot accommodation portions 30 and 32 in the rectangular wire 10a on the innermost diameter side is xa, the separation distance between the planned slot accommodation portions 30 and 32 in the rectangular wire 10b on the outermost diameter side is xb, the length of the inclined side between the connection parts between the planned coil end portions 34 and 36 and the planned slot accommodation portions 30 and 32 and the vertexes 34a and 36a in the rectangular wire 10a on the innermost diameter side is ya, the length of the inclined side between the connection parts between the planned coil end portions 34 and 36 and the planned slot accommodation portions 30 and 32 and the vertexes 34a and 36a in the rectangular wire 10b on the outermost diameter side is yb, the angle formed along the circumference about the shaft center in arc formation by the planned slot accommodation portion 30 and the planned slot accommodation portion 32 is θ1, and the difference (axial direction distance) between the positions in the axial direction of the vertexes 34a and 36a of the planned coil end portions 34 and 36 in the rectangular wire 10a on the innermost diameter side and the positions in the axial direction of the vertexes 34a and 36a of the planned coil end portions 34 and 36 in the rectangular wire 10b on the outermost diameter side is g.

In addition, as illustrated in FIGS. 9A and 9B, in the inserted coil 10, it is assumed that the separation distance between the slot accommodation portions 30 and 32 in the rectangular wire 10a on the innermost diameter side is Xa, the separation distance between the slot accommodation portions 30 and 32 in the rectangular wire 10b on the outermost diameter side is Xb, the length of the inclined side between the connection parts between the coil end portions 34 and 36 and the slot accommodation portions 30 and 32 and the vertexes 34a and 36a in the rectangular wire 10a on the innermost diameter side is Ya, the length of the inclined side between the connection parts between the coil end portions 34 and 36 and the slot accommodation portions 30 and 32 and the vertexes 34a and 36a in the rectangular wire 10b on the outermost diameter side is Yb, the angle formed along the circumference about the shaft center (that is, the shaft center of the stator 12) in arc formation by the slot accommodation portion 30 and the slot accommodation portion 32 is θ2, and the difference (axial direction distance) between the positions in the axial direction of the vertexes 34a and 36a of the coil end portions 34 and 36 in the rectangular wire 10a on the innermost diameter side and the positions in the axial direction of the vertexes 34a and 36a of the coil end portions 34 and 36 in the rectangular wire 10b on the outermost diameter side is G.

In the rectangular wire concentrically wound coil 10 for which such parameter setting has been made, θ1=θ2 holds, ya=Ya and yb=Yb hold, and xa/xb=Xa/Xb holds. In addition, the above axial direction distance g is more than 0 in the uninserted coil 10 and the above axial direction distance G is 0, which is smaller than the axial direction distance g, in the inserted coil 10. This is caused by the fact that the shapes of the planned coil end portions 34 and 36 as seen from the radially inner side are different between the inner diameter side and the outer diameter side as illustrated in FIGS. 8A and 8B and FIGS. 9A and 9B.

As described above, in the structure of the rectangular wire concentrically wound coil 10 according to the embodiment, by forming the uninserted coil 10 before being mounted to the stator core 14 so that the distance in the axial direction between the vertex 34a of the planned coil end portion 34 and the vertex 36a of the planned coil end portion 36 is gradually increased toward the rectangular wire 10b on the outermost diameter side from the rectangular wire 10a on the innermost diameter side, the inserted coil 10 after being mounted to the stator core 14 can be bent and deformed so that the distance (height) in the axial direction from the connection portions between the coil end portion 34 and the slot accommodation portions 30 and 32 to the position of the vertex 34a is identical to the distance (height) in the axial direction from the connection portions between the coil end portion 36 and the slot accommodation portions 30 and 32 to the position of the vertex 36a in the part from the rectangular wire 10a on the innermost diameter side to the rectangular wire 10a on the outermost diameter side. That is, the inserted coil 10 can be bent and deformed so that the distance in the axial direction between the vertex 34a of the coil end portion 34 and the vertex 36a of the coil end portion 36 is identical in the part from the rectangular wire 10a on the innermost diameter side to the rectangular wire 10b on the outermost diameter side.

Accordingly, in the embodiment, after the rectangular wire concentrically wound coil 10 is mounted to the stator core 14, the heights in the axial direction of the vertexes 34a and 36a of the coil end portions 34 and 36 in the rectangular wire concentrically wound coil 10 from the end surfaces of the stator core 14 can be made identical in the part from the rectangular wire 10a on the innermost diameter side to the rectangular wire 10b on the outermost diameter side. That is, the outer appearance of the stator 12 in which the rectangular wire concentrically wound coils 10 have been mounted to the stator core 14 can be formed in a regular shape. Accordingly, the embodiment can prevent the structures of production facilities and transportation jigs in a post-process from being complicated and improve the workability of transportation and assembly of the stator.

In addition, in the embodiment, the heights of the vertexes 34a and 36a related to the rectangular wire 10a on the inner diameter side in the rectangular wire concentrically wound coil 10 are prevented from exceeding the heights of the vertexes 34a and 36a related to the rectangular wire 10b on the outer diameter side in the rectangular wire concentrically wound coil 10, it is possible to suppress an increase in the heights of the vertexes 34a and 36a related to the rectangular wire 10a on the inner diameter side and reduce the dimension in the axial direction of the coil end portion 34.

When the rectangular wire concentrically wound coils 10 are mounted to the stator core 14 in the state in which the lead wire portions 40 and 42 linearly extend in the axial direction as in the planned slot accommodation portions 30 and 32, since the lead wire portions 40 and 42 are not hooked on the stator core 14 when the planned slot accommodation portions 30 and 32 of the rectangular wire concentrically wound coils 10 are inserted into the slots 24, the lead wire portions 40 and 42 may be drawn into the slots 24.

In contrast, in the embodiment, the uninserted coils 10 included in the initial coil assembly 44 are formed so that the lead wire portions 40 and 42 are bent and deformed in the edgewise direction or the flatwise direction. In such a structure, when the planned slot accommodation portions 30 and 32 of the rectangular wire concentrically wound coil 10 are inserted into the slots 24, the lead wire portions 40 and 42 (particularly the connection parts between the lead wire portions 40 and 42 and the planned slot accommodation portions 30 and 32) bent and deformed in the edgewise direction or the flatwise direction are hooked on the stator core 14. Accordingly, in the embodiment, when the planned slot accommodation portions 30 and 32 of the rectangular wire concentrically wound coils 10 are inserted into the slots 24, it is possible to prevent the lead wire portions 40 and 42 from being drawn into the slots 24. Accordingly, it is possible to improve the accuracy of bending the rectangular wire concentrically wound coils 10 and surely make the heights in the axial direction of the vertexes 34a and 36a of the coil end portions 34 and 36 from the end surfaces of the stator core 14 identical in the part from the rectangular wire 10a on the innermost diameter side to the rectangular wire 10b on the outermost diameter side.

In addition, in the embodiment, the concentrically wound coil 10 after being inserted has substantially the same distance in the axial direction between the inner diameter side and the outer diameter side, but the degree of falling toward the radially outer side in the coil end portions 34 and 36 may be larger on the outer diameter side conductive wire than on the inner diameter side conductive wire. Accordingly, the distance in the radial direction between the conductive wires on the outer diameter side of the coil end portions 34 and 36 may be larger than the distance on the inner diameter side. As a result, when the coil end portions 34 and 36 are cooled, it is possible to efficiently guide cooling oil to the inside (inner side in the axial direction) of the coil end portions 34 and 36 through the gap between the conductive wires on the outer diameter side of the coil end portions 34 and 36 and improve the cooling efficiency. In addition, since the distance in the axial direction is substantially the same while allowing falling toward the radially outer side, a jig and process for preventing falling toward the radially outer side becomes unnecessary as compared with the case in which the distance in the axial direction is made identical while preventing falling toward the radially outer side, thereby improving the productivity.

In the above embodiment, the lead wire portions 40 and 42 of the uninserted coil 10 is crooked and bent and deformed as illustrated in FIGS. 3A and 3B. However, the disclosure is not limited to the embodiment and the lead wire portions 40 and 42 may be crooked and bent and deformed in a shape other than that illustrated in FIGS. 3A and 3B.

In addition, in the above embodiment, before the rectangular wire concentrically wound coils 10 are mounted to the stator core 14, the inner diameter side lead wire portion 40 has a shape bent and deformed only in the edgewise direction and the outer diameter side lead wire portion 42 has a shape bent and deformed in the edgewise direction and the flatwise direction. In particular, the connection part between the inner diameter side lead wire portion 40 and the planned slot accommodation portions 30 and 32 has a shape bent and deformed in the edgewise direction and the connection part between the outer diameter side lead wire portion 42 and the planned slot accommodation portions 30 and 32 has a shape bent and deformed in the edgewise direction. However, the disclosure is not limited to the embodiment and the connection part between the inner diameter side lead wire portion 40 and the planned slot accommodation portions 30 and 32 and the connection part between the outer diameter side lead wire portion 42 and the planned slot accommodation portions 30 and 32 may have a shape bent and deformed in the flatwise direction.

The following examples will be further disclosed with respect to the above embodiments.

[1] A stator assembling method for mounting a plurality of concentrically wound coils (10) to an annular stator core (14), each of the concentrically wound coils (10) being formed by winding a conductive wire (10a) for a plurality of turns, each of the concentrically wound coils (10) having planned slot accommodation portions (30 and 32) and planned coil end portions (34 and 36), the annular stator core (14) having slots (24) formed between adjacent teeth (22) extending from a back yoke (20) to a radially inner side, a spacing between the slots (24) being widened toward a radially outer side, the stator assembling method including the steps of forming a coil assembly in which the plurality of the concentrically wound coils (10) are disposed annularly and pushing the plurality of the concentrically wound coils (10) included in the coil assembly disposed in a space on an inner diameter side of the stator core (14) to an outer diameter side and inserting the plurality of the concentrically wound coils (10) into the slots (24) of the stator core (14), wherein each of the plurality of the concentrically wound coils (10) has vertexes (34a and 36a) oriented outward in a axial direction in the planned coil end portions (34 and 36), and a distance in the axial direction between the vertexes (34a and 36a) of the planned coil end portions (34 and 36) on both sides in the axial direction of each of the plurality of concentrically wound coils (10) is gradually reduced toward the conductive wire mounted on the inner diameter side of the stator core (14) from the conductive wire mounted on the outer diameter side of the stator core (14).

In the structure described in [1] above, when the planned slot accommodation portions 30 and 32 are inserted into the slots 24, that is, when the separation distance between the planned slot accommodation portions 30 and 32 on both ends in the circumferential direction is gradually increased and the distance in the axial direction between the vertexes 34a and 36a of the planned coil end portions 34 and 36 on both sides in the axial direction is gradually reduced, the conductive wire 10a on the inner diameter side has a relatively small deformation amount and the conductive wire 10b on the outer diameter side has a relatively large deformation amount. Accordingly, after mounting to the stator core, the heights of the vertexes 34a and 36a related to the conductive wire on the inner diameter side of the concentrically wound coil 10 are prevented from exceeding the heights of the vertexes 34a and 36a related to the conductive wire on the outer diameter side. This can suppress an increase in the heights of the vertexes 34a and 36a related to the conductive wire on the inner diameter side and reduce the dimension in the axial direction of the coil end portion 34 in the concentrically wound coil 10.

[2] The stator assembling method according to [1], wherein a separation distance in a circumferential direction between the planned slot accommodation portions (30 and 32) on both sides in the circumferential direction in each of the plurality of concentrically wound coils (10) is gradually increased toward the conductive wire (10b) mounted on the outer diameter side of the stator core (14) from the conductive wire (10a) mounted on the inner diameter side of the stator core (14).

[3] The stator assembling method according to [1] or [2], wherein, after the plurality of concentrically wound coils (10) are mounted to the stator core (14), the distance in the axial direction is identical in the part from the conductive wires (10a) mount on the inner diameter side of the stator core (14) to the conductive wires (10b) mount on the outer diameter side of the stator core (14).

[4] The stator assembling method according to any one of [1] to [3], wherein the conductive wire is a rectangular wire, each of the plurality of concentrically wound coils (10) has lead wire portions (40 and 42) that are formed at both ends of the wound rectangular wire, connected to the planned slot accommodation portions (30 and 32), and project in the axial direction from an end surface in the axial direction of the stator core (14), and each of the lead wire portions (40 and 42) has a shape bent in an edgewise direction or a flatwise direction.

In the structure described in [4] above, since the lead wire portions are hooked on the stator core when the planned slot accommodation portions of the concentrically wound coil are inserted into the slots, the lead wire portions can be prevented from being drawn into the slots.

[5] A stator (12) including
a stator core (14) formed by laminating annular steel plates, the stator core (14) including a plurality of teeth (22) extending to a radially inner side from a back yoke and slots (24) formed between the adjacent teeth (22) and
a plurality of coils (10), each of the coils (22) being formed by continuously winding a single conductive wire for a plurality of turns, each of the coils including a plurality of slot accommodation portions (30 and 32) to be accommodated in the different slots (24) and coil end portions (34 and 36) connecting the slot accommodation portions (30 and 32) to each other and having vertexes (34a and 36a) oriented outward in the axial direction, wherein each of the coils (10) is formed so that a length of one turn of the conductive wire disposed on an inner diameter side is shorter than a length of one turn of the conductive wire disposed on an outer diameter side and a distance between the vertexes (34a and 36a) on the inner diameter side and an end surface of the stator core (14) is equal to a distance between the vertexes (34a and 36a) on the outer diameter side and the end surface of the stator core (14).

In the structure described in [5] above, the coil (10) is configured so that the length of one turn of the conductive wire disposed on the inner diameter side is less than the length of one turn of the conductive wire disposed on the outer diameter side. In addition, the distance between the vertexes (34a and 36a) on the inner diameter side and the end surface of the stator core (14) is the same as the distance between the vertexes (34a and 36a) on the outer diameter side and the end surface of the stator core (14). This can suppress an increase in the heights of the vertexes 34a and 36a related to the conductive wire on the inner diameter side and reduce the dimension in the axial direction of the coil end portion 34 in the concentrically wound coil 10.

[6] The stator (12) according to [5] above wherein the length of one turn of the conductive wire of each of the coils (10) is increased toward the outer diameter side from the inner diameter side.

The present international application claims priority based on Japanese Patent Application No. 2014-177443 filed on Sep. 1, 2014, and the entire contents thereof are incorporated herein by reference.

The invention claimed is:

1. A method for mounting a plurality of concentrically wound coils to an annular stator core, the method comprising:
separately providing the stator core that includes an inner diameter side and an outer diameter side, and a coil assembly in which the plurality of concentrically wound coils are disposed annularly, wherein:
the coil assembly further comprising forming each of the concentrically wound coils by winding a plurality of turns of a conductive wire, the each of the concentrically wound coils having planned slot accommodation portions and planned coil end portions,
the stator core further comprising slots formed between adjacent teeth extending from a back yoke to a radially inner side, a spacing between the slots being widened toward a radially outer side, and
the each of the plurality of the concentrically wound coils that is formed has vertexes oriented outward in an axial direction in the planned coil end portions, and a distance in the axial direction between the vertexes of the planned coil end portions on both sides in the axial direction of each of the plurality of concentrically wound coils is gradually reduced toward the conductive wire to be mounted on the inner diameter side of the stator core from the conductive wire to be mounted on the outer diameter side of the stator core; and
mounting the plurality of the concentrically wound coils onto the stator core by pushing the plurality of the concentrically wound coils included in the coil assembly disposed in a space on the inner diameter side of the stator core to the outer diameter side and inserting the plurality of the concentrically wound coils into the slots of the stator core, wherein, after the plurality of concentrically wound coils are mounted to the stator core, the distance in the axial direction is identical in the part from the conductive wires mounted to the inner diameter side of the stator core to the conductive wires mounted to the outer diameter side of the stator core.

2. The method according to claim 1, wherein, after the plurality of concentrically wound coils are mounted to the stator core, a separation distance in a circumferential direction between the planned slot accommodation portions on both sides in the circumferential direction in each of the plurality of concentrically wound coils is gradually increased toward the conductive wire mounted on the outer diameter side of the stator core from the conductive wire mounted on the inner diameter side of the stator core.

3. The method according to claim 2, wherein, after the plurality of concentrically wound coils are mounted to the stator core:
  the conductive wire is a rectangular wire,
  each of the plurality of concentrically wound coils has lead wire portions that are provided at both ends of the wound rectangular wire, connected to the planned slot accommodation portions, and project in the axial direction from an end surface in the axial direction of the stator core, and
  each of the lead wire portions has a shape bent in an edgewise direction or a flatwise direction.

4. The method according to claim 1, wherein, after the plurality of concentrically wound coils are mounted to the stator core:
  the conductive wire is a rectangular wire,
  each of the plurality of concentrically wound coils has lead wire portions that are provided at both ends of the wound rectangular wire, connected to the planned slot accommodation portions, and project in the axial direction from an end surface in the axial direction of the stator core, and
  each of the lead wire portions has a shape bent in an edgewise direction or a flatwise direction.

\* \* \* \* \*